(12) United States Patent
Contreras et al.

(10) Patent No.: US 9,117,474 B1
(45) Date of Patent: Aug. 25, 2015

(54) IMPLEMENTING WRITE HEAD DEVICE FOR CONTACT DETECTION AND SPACING SENSING

(71) Applicant: HGST Netherlands B.V., Amsterdam (NL)

(72) Inventors: John Contreras, Palo Alto, CA (US); Samir Y. Garzon, San Jose, CA (US); Timothy Scott Hughbanks, Hollister, CA (US); Albert John Wallash, Morgan Hill, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/504,794

(22) Filed: Oct. 2, 2014

(51) Int. Cl.
*G11B 21/02* (2006.01)
*G11B 5/60* (2006.01)
*G11B 5/00* (2006.01)

(52) U.S. Cl.
CPC ...... *G11B 5/6005* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 7,486,459 B1 | 2/2009 | Schreck et al. | |
| 7,518,818 B2 | 4/2009 | Yamazaki et al. | |
| 7,830,634 B2 | 11/2010 | Chen et al. | |
| 7,852,594 B2 | 12/2010 | Maeda et al. | |
| 8,085,490 B2 | 12/2011 | Franca-Neto et al. | |
| 8,238,058 B2 | 8/2012 | Shimizu et al. | |
| 8,406,090 B2 * | 3/2013 | Juang et al. | 369/13.03 |
| 8,446,690 B2 | 5/2013 | Alex et al. | |
| 8,467,148 B2 | 6/2013 | Iwasaki et al. | |
| 8,472,135 B1 * | 6/2013 | Kusukawa et al. | 360/110 |
| 8,537,488 B2 | 9/2013 | Kawamoto et al. | |
| 8,570,684 B1 | 10/2013 | Contreras et al. | |
| 8,599,506 B2 | 12/2013 | Contreras et al. | |
| 8,638,349 B1 * | 1/2014 | Liu et al. | 346/78 |
| 2011/0235208 A1 | 9/2011 | Yang | |
| 2012/0120519 A1 | 5/2012 | Kunkel et al. | |
| 2013/0050865 A1 * | 2/2013 | Katada et al. | 360/31 |
| 2013/0050869 A1 | 2/2013 | Nagasaka et al. | |
| 2013/0083423 A1 | 4/2013 | Shiroishi et al. | |
| 2013/0083430 A1 * | 4/2013 | Chiu et al. | 360/234.3 |
| 2013/0170060 A1 * | 7/2013 | Johns et al. | 360/31 |
| 2013/0229895 A1 | 9/2013 | Shiroishi et al. | |
| 2013/0286802 A1 * | 10/2013 | Kiely | 369/13.31 |
| 2013/0286805 A1 * | 10/2013 | Macken et al. | 369/13.33 |
| 2014/0009851 A1 * | 1/2014 | Budde | 360/59 |
| 2014/0078618 A1 * | 3/2014 | Matsumoto et al. | 360/99.08 |
| 2014/0146647 A1 * | 5/2014 | Andruet et al. | 369/13.17 |

OTHER PUBLICATIONS

Abstract of "Dynamic Fly Performance of Air Bearing Sliders on Patterned Media", by J. Hanchi et al., pp. 46-50, Jan. 2011 http://ieeexplore.ieee.org/stamp/stamp.jsp?tp=&arnumber=5560776&isnumber=5676431.

* cited by examiner

*Primary Examiner* — Tan X Dinh
(74) *Attorney, Agent, or Firm* — Joan Pennington (57) ABSTRACT

A method, apparatus, and system are provided for implementing a write head device for writer-to-disk contact detection and spacing sensing of recording heads in hard disk drives (HDDs). A write head device, such as a spin-torque oscillator (STO), is provided between a main pole tip and a surrounding magnetic shield of the writer in the recording head. A pair of connections is provided to the magnetic shield and the main pole of the writer, and resistance of the write head device is measured to detect writer to disk spacing and contact.

20 Claims, 7 Drawing Sheets

IMPLEMENTING WRITE HEAD DEVICE FOR CONTACT DETECTION AND SPACING SENSING

FIELD OF THE INVENTION

The present invention relates generally to the data storage field, and more particularly, relates to a method, apparatus, and system for implementing a write head device for writer-to-disk contact detection and spacing sensing of recording heads in hard disk drives (HDDs), such as microwave assisted magnetic recording (MAMR) heads.

DESCRIPTION OF THE RELATED ART

Many data processing applications require long-term data storage and typically a high-degree of data integrity. Typically these needs are met by non-volatile data storage devices. Non-volatile storage or persistent media can be provided by a variety of devices, most commonly, by direct access storage devices (DASDs), which also are referred to as hard disk drives (HDDs).

Microwave assisted magnetic recording (MAMR) heads in hard disk drives (HDDs) provide improved areal density and/or improve data error rates by producing a more precisely defined magnetic foot print, which is produced by the MAMR head writer. This is accomplished by adding a source of microwave radiation near the write head. This microwave oscillator produces a magnetic field in multi-Giga Hertz frequency range.

Head to disk spacing is critical for optimal magnetic recording and data read-back. Decreasing the head to disk clearance is required as bit densities continue to increase. Precise knowledge and control of the head to disk clearance is critical to avoid reliability issues caused by repeated head to disk contact or fly height changes. State of the art sliders include a thermal flyheight control (TFC) heater which expands the slider moving the read and write heads closer to the disk. At the same time an embedded contact sensor (ECS), a stripe of material at an air bearing surface (ABS) of the slider changes resistance with temperature, and is used to detect slider to disk contact, where frictional heating from contact increases ECS temperature and resistance. Also slider to disk spacing with closer proximity to disk surface, without actual contact, allows the slider to dissipate heat better, decreasing the ECS temperature and resistance.

While ECS can detect when the lowest point on the slider touches the disk (minimum point), it can not measure the spacing between read head and disk (Rs) or the spacing between writer and disk (Ws). ECS can only measure the average spacing between the ECS stripe and the disk, which is related to but not the same as Rs and Ws.

Finding the read sensor to disk spacing can be done using a Wallace curve spacing calibration, based on how the readback signal decreases with spacing. However, no technique exists for determining the writer to disk spacing.

A need exists for an effective write head device for implementing writer-to-disk contact detection and spacing sensing of recording heads in hard disk drives (HDDs).

In the following description and claims, the term "disk" should be understood to broadly include various magnetic media used with read and write recording heads, for example including various tape drive magnetic media and various spinning disk magnetic media.

SUMMARY OF THE INVENTION

Aspects of the preferred embodiments are to provide a method, apparatus, and system for implementing a write head device for writer-to-disk contact detection and spacing sensing of recording heads in hard disk drives (HDDs). Other important aspects of the preferred embodiments are to provide such method, apparatus, and system substantially without negative effect and to overcome some of the disadvantages of prior art arrangements.

In brief, a method, apparatus, and system are provided for implementing a write head device for writer-to-disk contact detection and spacing sensing of recording heads in hard disk drives (HDDs). A write head device, such as a spin-torque oscillator (STO), is provided between a main pole tip and a surrounding magnetic shield of the writer in the recording head. A pair of connections is provided to the magnetic shield and the main pole of the writer, and resistance of the write head device is measured to detect writer to disk spacing and contact.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the preferred embodiments, a method, apparatus, and system are provided for implementing writer-to-disk contact detection and spacing sensing for microwave assisted magnetic recording (MAMR) hard disk drives (HDDs).

Figure 1:
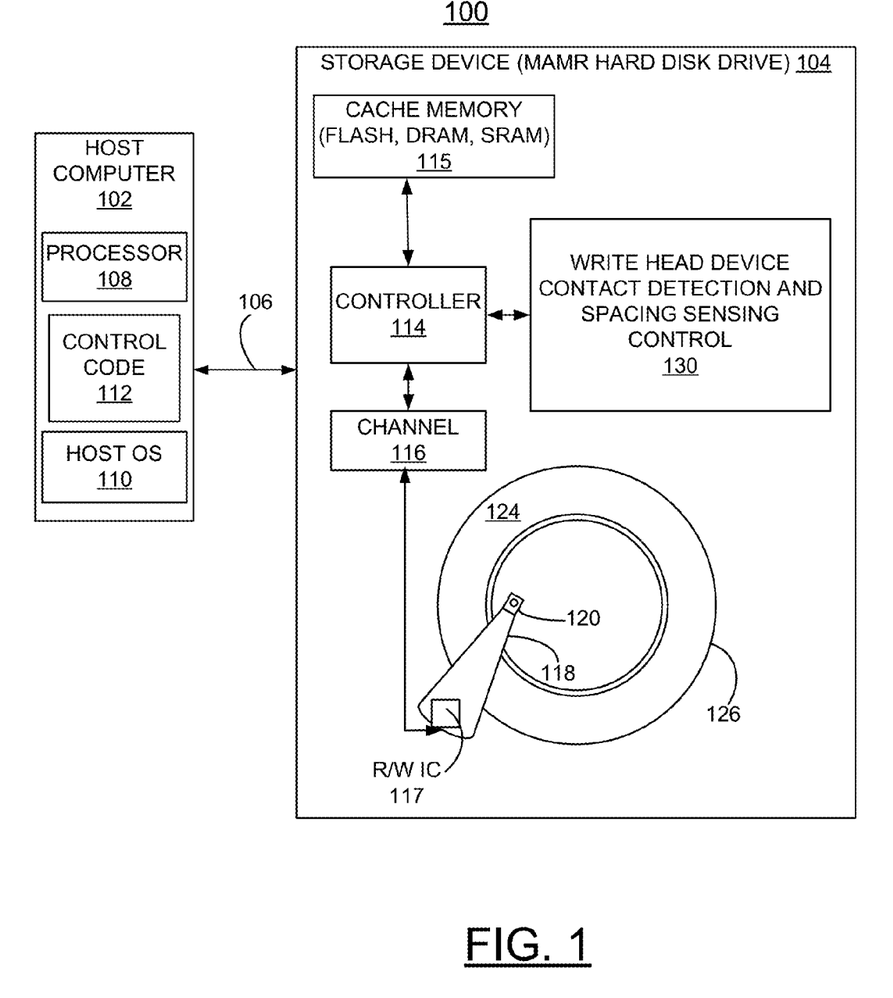
FIG. 1 is a block diagram representation illustrating a system for implementing writer-to-disk contact detection and spacing sensing of microwave assisted magnetic recording (MAMR) heads in hard disk drives (HDDs) in accordance with preferred embodiments.

Having reference now to the drawings, in FIG. 1, there is shown an example system generally designated by the reference character 100 for implementing writer-to-disk contact detection and spacing sensing for operation microwave assisted magnetic recording (MAMR) hard disk drives (HDDs) in accordance with preferred embodiments. System 100 includes a host computer 102, a storage device 104, such as a hard disk drive (HDD) 104, and an interface 106 between the host computer 102 and the storage device 104.

As shown in FIG. 1, host computer 102 includes a processor 108, a host operating system 110, and control code 112. The storage device or microwave assisted magnetic recording (MAMR) hard disk drive 104 includes a controller 114 coupled to a cache memory 115, for example, implemented with one or a combination of a flash memory, a dynamic random access memory (DRAM) and a static random access memory (SRAM), and coupled to a data channel 116. The storage device or hard disk drive 104 includes a Read/Write (R/W) integrated circuit (IC) 117 implementing writer-to-disk contact detection and writer-to-disk spacing sensing. The storage device or hard disk drive 104 includes an arm 118 carrying a slider 120 for in accordance with preferred embodiments. The slider 120 flies over a writable disk surface 124 of a disk 126 and includes at least one microwave assisted magnetic recording (MAMR) head, for example, integrated with the slider 120.

In accordance with features of preferred embodiments, a write head device contact detection and spacing sensing control 130 is provided with the controller 114 to control STO resistance checking and current checking, for example, at power-up and periodically during operation of the MAMR HDD 104, to identify writer-to-disk spacing and writer-to-disk contact. The write head device writer-to-disk spacing and writer-to-disk contact detection can be performed periodically when the MAMR head is flying over the disk 216.

System 100 including the host computer 102 and the MAMR HDD 104 is shown in simplified form sufficient for understanding the present embodiments. The illustrated host computer 102 together with the storage device or HDD 104 is not intended to imply architectural or functional limitations. The present invention can be used with various hardware implementations and systems and various other internal hardware devices.

Figure 2:
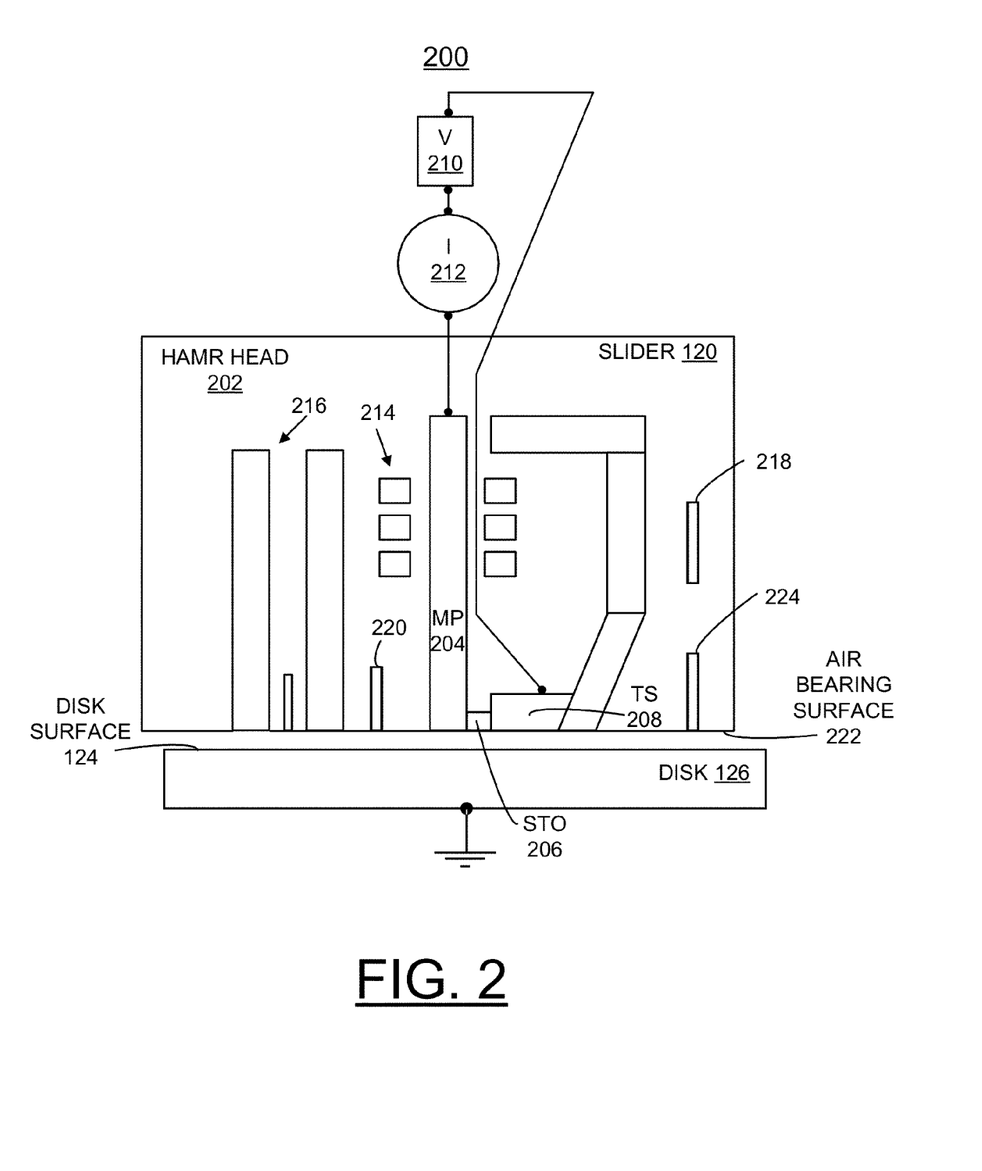
FIGS. 2 and 3 schematically illustrates a respective example circuit and an example write head device provided between a main pole tip and a surrounding magnetic shield for implementing writer-to-disk contact detection and spacing sensing of microwave assisted magnetic recording (MAMR) heads in hard disk drives (HDDs) in accordance with preferred embodiments.

While the HDD 104 and the writer-to-disk contact detection circuit 200 is illustrated and described with respect to microwave assisted magnetic recording (MAMR) heads, it should be understood that the present invention is applicable to various recording heads, and is not limited to MAMR heads.

Figure 3:
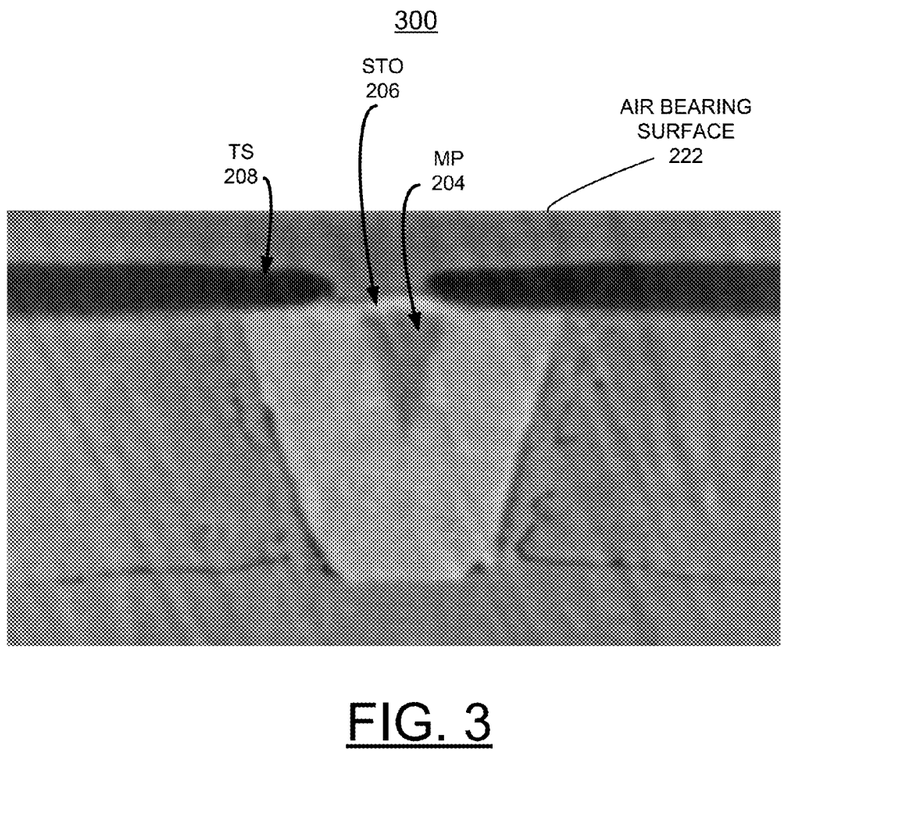

Referring now to FIGS. 2 and 3 there are shown an example circuit generally designated by the reference character 200 and an example write head device generally designated by the reference character 300 for implementing writer-to-disk contact detection and spacing sensing of microwave assisted magnetic recording (MAMR) heads in hard disk drives (HDDs) in accordance with preferred embodiments.

In FIG. 2, the writer-to-disk contact and spacing detection circuit 200 includes a MAMR head 202 provided with the slider 120. The MAMR head 202 includes a main magnetic pole (MP) 204, a write head device 206, and a trailing shield pole 208 of the head writer. A voltage source 210 applies a voltage V between the main pole MP 204 and the trailing shield TS 208. A current I, 212 is measured to determine the resistance of the write head device 206 used to identify writer-to-disk spacing and writer-to-disk contact with the MAMR head 202 flying over the disk surface 124 of disk 126.

In accordance with features of preferred embodiments, the write head device 206 is formed of a selected material having a predefined coefficient of resistance (TCR) or large thermoelectric coefficients disposed in electrical contact engagement with the main pole tip 204 and extending between the main pole tip and the magnetic shield of the writer in the MAMR head. It should be understood that the write head device 206 optionally is implemented with a spin-torque oscillator (STO), but is not limited to STO material.

As shown, the MAMR head 202 includes a coil 214 positioned proximate the main magnetic pole MP 204, a reader 216, and a thermal flying height control 218. The HAMR head 202 optionally includes a conventional embedded contact sensor (ECS) 220 proximate an air bearing surface 222 of the MAMR head 202. The embedded contact sensor (ECS) 220 is a large structure located away from the pole tip, and is substantially larger than the write head device 206. A heater in the MAMR head 202 uses the thermal fly height control 218 to bring the writer closer to the disk 126. The HAMR head 202 optionally includes a conventional acoustic emission sensor 224 proximate the air bearing surface 222 of the MAMR head 202.

The main pole MP 204 and the trailing shield TS 208 of the head writer are protruded most by the TFC heater as indicated by a dashed line, providing the first contact point to the disk 126 in the MAMR head 202 design. The TFC 218 and the writer heating can put the main pole MP 204, the trailing shield TS 208, and the STO 206 against the disk 126.

As shown in the ABS scanning electron microscope (SEM) image in FIG. 3, the example write head device 300 includes the STO write head device 206 positioned proximate the main magnetic pole MP 204 and the trailing shield TS 208.

Figure 4:
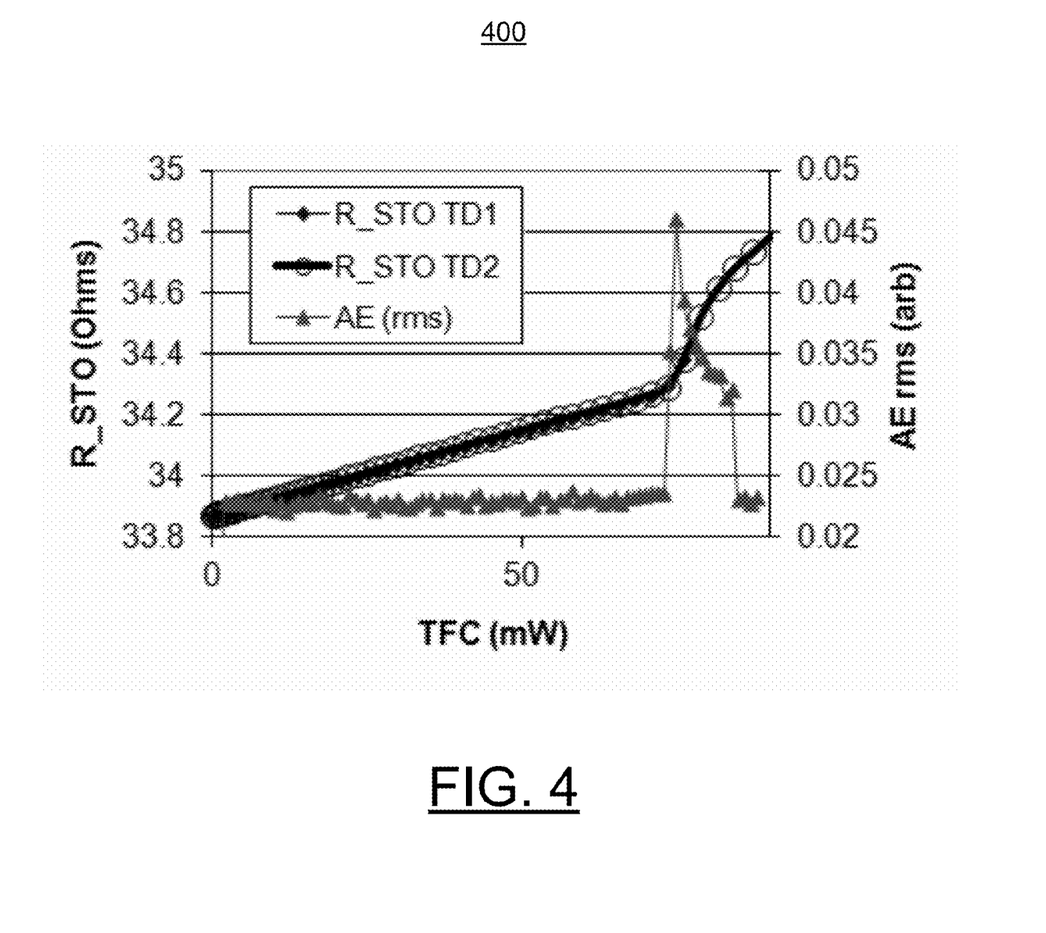
FIG. 4 illustrates example waveforms of example spin-torque oscillator (STO) resistance for comparison with respective example acoustic emission (AE) sensor signal with respect to thermal flyheight control (TFC) power in the accordance with preferred embodiments.

Referring now to FIG. 4, there are shown example waveforms generally designated by the reference character 400 including example spin-torque oscillator (STO) resistance for comparison with respective example acoustic emission (AE) sensor signal with respect to thermal flyheight control (TFC) power in the accordance with preferred embodiments. As shown, the AE signal includes a sharp increase at TFC equal to 72 mW, indicating head to disk contact. The STO resistance increases with TFC power linearly, due to slider heating with TFC, and at TFC equal to 72 mW, the STO resistance increases much faster, showing good correlation between AE-detected and STO-detected head to disk contact. Multiple repetitions of the procedure provide very reproducible signals for the STO resistance.

Figure 5:
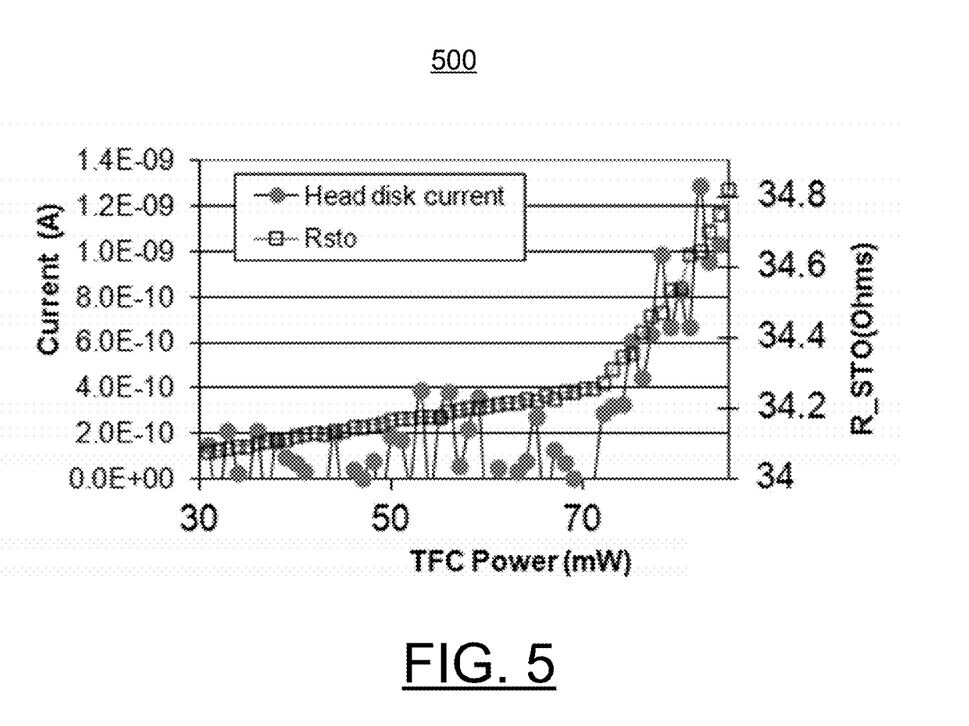
FIG. 5 illustrates example waveforms of example spin-torque oscillator (STO) resistance for comparison with respective example current between writer pole tip and disk with respect to thermal flyheight control (TFC) power in the accordance with preferred embodiments.

Referring now to FIG. 5, there are shown example waveforms generally designated by the reference character 500 including example spin-torque oscillator (STO) resistance for comparison with respective example current between writer pole tip and disk with respect to thermal flyheight control (TFC) power in the accordance with preferred embodiments. As shown, the STO resistance increases with TFC power linearly, due to slider heating with TFC, and at TFC equal to 72 mW, the STO resistance increases much faster, showing good correlation between current between writer pole tip and disk and STO-detected head to disk contact.

Figure 6:
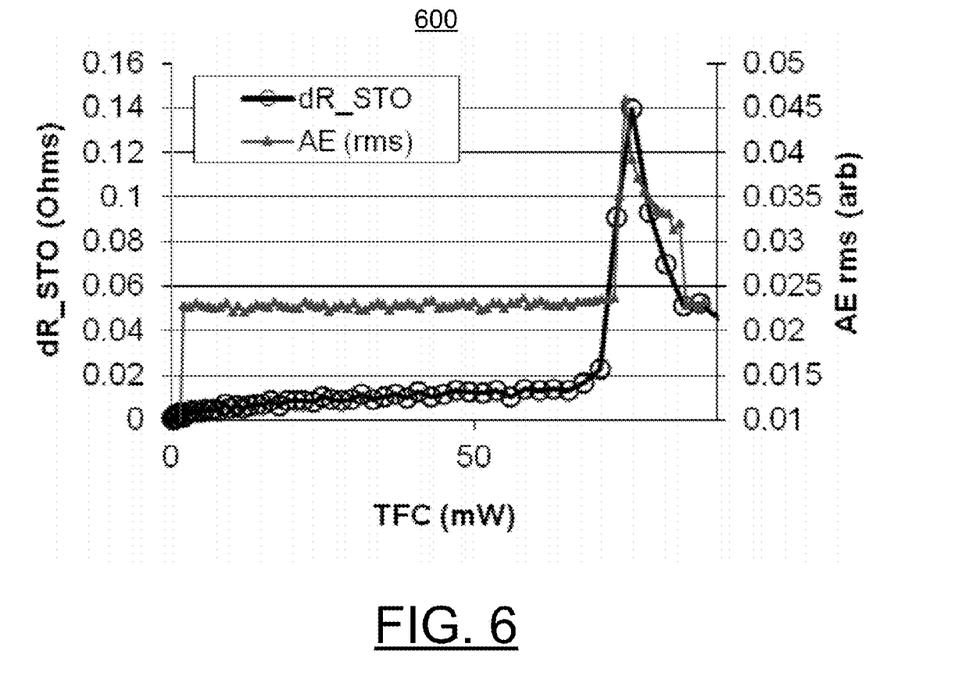
FIG. 6 illustrates example waveforms of example derivative of spin-torque oscillator (STO) resistance contact signal for comparison with respective example acoustic emission (AE) sensor signal with respect to thermal flyheight control (TFC) power in the accordance with preferred embodiments.

Referring now to FIG. 6, there are shown example waveforms generally designated by the reference character 600 including example derivative of spin-torque oscillator (STO) resistance contact signal for comparison with respective example acoustic emission (AE) sensor signal with respect to thermal flyheight control (TFC) power in the accordance with preferred embodiments. Better touch-down signal visibility can be obtained by calculating the derivation of the STO data as demonstrated in FIG. 6, where a simple 2-point difference was sued. Curvature in the STO signal 5 mW before AE touchdown indicates that the STO is sensitive enough to determine spacing signals before frictional heating occurs and therefore not only provides accurate writer to disk contact detection, but in addition that writer to disk clearance can be monitored by measuring the STO resistance. For example, signal threshold detection circuits in the preamplifier R/W IC 117 advantageously are utilized to alert the system 100 of decreased writer to disk spacing and alert, for example, a system on chip (SOC) of HDD 104 to execute head withdrawal procedures.

Figure 7:
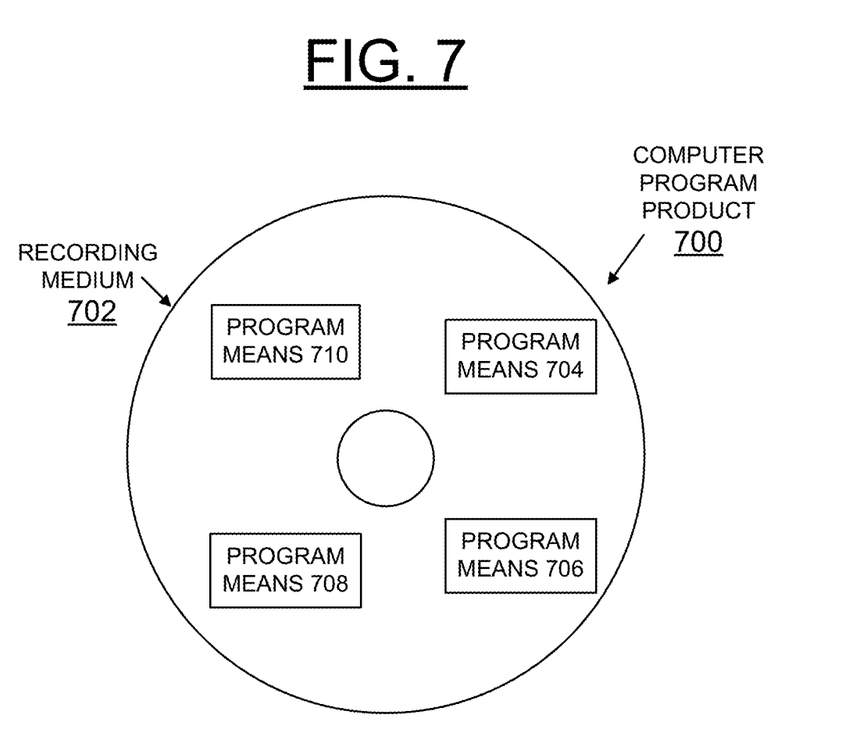
FIG. 7 is a block diagram illustrating a computer program product in accordance with preferred embodiments.

Referring now to FIG. 7, an article of manufacture or a computer program product 800 of the preferred embodiments is illustrated. The computer program product 700 includes a computer readable recording medium 702, such as, a floppy disk, a high capacity read only memory in the form of an optically read compact disk or CD-ROM, a tape, or another similar computer program product. Computer readable recording medium 702 stores program means or control code 704, 706, 708, 710 on the medium 702 for carrying out the methods for implementing writer-to-disk contact detection and spacing sensing for MAMR hard disk drives in accordance with preferred embodiments in the system 100 of FIG. 1.

A sequence of program instructions or a logical assembly of one or more interrelated modules defined by the recorded program means or control code 704, 706, 708, 710, direct HDD controller 114 using writer-to-disk contact and spacing detector circuit 200 of the system 100 to implement writer-to-disk contact detection and spacing sensing of preferred embodiments.

While the present invention has been described with reference to the details of the embodiments of the invention shown in the drawing, these details are not intended to limit the scope of the invention as claimed in the appended claims.

What is claimed is:

1. A method for implementing a write head device for writer-to-disk contact detection and spacing sensing of recording heads in hard disk drives (HDDs) comprising:
    providing a write head device disposed in electrical contact engagement with a main pole tip and extending between the main pole tip and a magnetic shield of a writer in a recording head;
    providing a voltage source with a respective connection to the magnetic shield and coupled to the main pole tip of the writer in the recording head, and applying voltage between the magnetic shield and the main pole tip and to the write head device;
    measuring current responsive to said applied voltage and identifying resistance of the write head device at power-up and periodically during HDD operation; and
    detecting writer to disk spacing and writer to disk contact using the identified resistance of the write head device, eliminating use of an embedded contact sensor (ECS) with implementing said write head device for writer-to-disk contact detection and spacing sensing.

2. The method as recited in claim 1 wherein providing a write head device between the main pole tip and the magnetic shield includes providing a spin-torque oscillator (STO) patterned between the main pole tip and the magnetic shield, and measuring resistance of the STO to detect writer to disk spacing and writer to disk contact.

3. The method as recited in claim 1 wherein providing a write head device includes providing a selected material having a predefined coefficient of resistance (TCR) disposed in electrical contact engagement with the main pole tip and extending between the main pole tip and the magnetic shield of the writer in the recording head.

4. The method as recited in claim 1 includes applying a voltage to the write head device and measuring resistance of the write head device includes measuring a predefined change in resistance of the write head device to identify writer to disk contact.

5. The method as recited in claim 1 wherein providing a write head device between the main pole tip and the magnetic shield includes providing a spin-torque oscillator (STO) positioned between said main pole tip and said magnetic shield and wherein only said STO electrically connects said main pole tip and said magnetic shield.

6. The method as recited in claim 1 wherein applying voltage to the write head device and measuring resistance of the write head device to detect writer to disk spacing and writer to disk contact includes monitoring temperature proximate the write pole tip by measuring resistance of the write head device.

7. An apparatus for implementing a write head device for writer-to-disk contact detection and spacing sensing for hard disk drive (HDDs) comprising:
    a controller;
    at least one disk; said disk including a disk media for storing data;
    a recording head including a reader and a writer,
    said writer including a write head device disposed in electrical contact engagement with a main pole tip and extending between the main pole tip and a magnetic shield of the writer;
    a voltage source with a respective connection to said magnetic-shield and said main pole tip of the writer in the recording head for applying voltage between the magnetic shield and the main pole tip and to said write head device;
    a current detector for measuring current responsive to said applied voltage and identifying resistance of the write head device at power-up and periodically during HDD operation; and
    said controller detecting writer to disk spacing and writer to disk contact using the identified resistance of the write head device, eliminating use of an embedded contact sensor (ECS) with implementing said write head device for writer-to-disk contact detection and spacing sensing.

8. The apparatus as recited in claim 7 includes control code stored on a non-transitory computer readable medium, and wherein said controller uses said control code to identify writer to disk spacing and writer to disk contact responsive to the measured resistance.

9. The apparatus as recited in claim 7 includes a Read/Write integrated circuit (IC) coupled to a slider, said slider containing said recording head including said reader and said writer, and said voltage source and current detector provided in said Read/Write integrated circuit (IC).

10. The apparatus as recited in claim 7 wherein said recording head includes a microwave assisted magnetic recording (MAMR) head and said write head device includes a spin-torque oscillator (STO) positioned between said main pole tip and said magnetic shield and wherein said main pole tip and said magnetic shield are electrically connected only at said STO.

11. The apparatus as recited in claim 7 wherein said write head device is formed of a selected material having a predefined coefficient of resistance (TCR) disposed in electrical contact engagement with the main pole tip and extending between the main pole tip and the magnetic shield of the writer in the recording head.

12. The apparatus as recited in claim 7 includes said voltage source applying voltage to said write head device and measuring resistance of the write head device includes measuring a predefined change in resistance of the write head device to identify writer to disk contact.

13. The apparatus as recited in claim 7 wherein only said write head device electrically connects said main pole tip and said magnetic shield.

14. The apparatus as recited in claim 7 wherein said write head device is provided for monitoring temperature proximate the write pole tip by measuring resistance of the write head device.

15. A system for implementing a write head device for writer-to-disk contact detection and spacing sensing comprising:
- a hard disk drive (HDD), said HDD comprising a controller;
- at least one disk; said disk including a disk media for storing data;
- a recording head including a reader and a writer,
  - said writer including a write head device disposed in electrical contact engagement with a main pole tip and extending between the main pole tip and a magnetic shield of the writer;
  - a voltage source with a respective connection to said magnetic shield and said main pole tip of the writer in the recording head for applying voltage between the magnetic shield and the main pole tip and to said write head device;
- a current detector for measuring current responsive to said applied voltage and identifying resistance of the write head device at power-up and periodically during HDD operation; and
- said controller detecting writer to disk spacing and writer to disk contact using the identified resistance of the write head device, eliminating use of an embedded contact sensor (ECS) with implementing said write head device for writer-to-disk contact detection and spacing sensing.

16. The system as recited in claim 15 includes control code stored on a non-transitory computer readable medium, and wherein said controller uses said control code to identify writer to disk spacing and writer to disk contact responsive to the measured resistance of said write head device.

17. The system as recited in claim 15 includes a Read/Write integrated circuit (IC) coupled to a slider, said slider containing said recording head including said reader and said writer, and said voltage source and current detector provided in said Read/Write integrated circuit (IC).

18. The system as recited in claim 15 wherein said recording head includes a microwave assisted magnetic recording (MAMR) head and said write head device includes a spin-torque oscillator (STO) positioned between said main pole tip and said magnetic shield and wherein said main pole tip and said magnetic shield are electrically connected only at said STO.

19. The system as recited in claim 15 includes said voltage source applying voltage to said write head device and measuring resistance of the write head device includes measuring a predefined change in resistance of the write head device to identify writer to disk contact.

20. The system as recited in claim 15 wherein said voltage source applying voltage to the write head device and measuring resistance of said write head device to detect writer to disk spacing and writer to disk contact includes monitoring temperature proximate the write pole tip by measuring resistance of said write head device.

* * * * *